(12) United States Patent
Gehring et al.

(10) Patent No.: US 12,540,961 B2
(45) Date of Patent: Feb. 3, 2026

(54) LARGE-SIGNAL INDUCTANCE MEASURING DEVICE AND METHOD FOR PERFORMING A MEASURING OPERATION FOR MEASURING AN INDUCTANCE

(71) Applicants: Fraunhofer-Gesellschaft zur Förderung der angewandten Forschung e.V., Munich (DE); Friedrich-Alexander-Universitaet Erlangen-Nuernberg, Erlangen (DE)

(72) Inventors: Johannes Gehring, Erlangen (DE); Raffael Schwanninger, Nuremberg (DE); Bernd Wunder, Erlangen (DE)

(73) Assignees: Fraunhofer-Gesellschaft zur Förderung der angewandten Forschung e.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 167 days.

(21) Appl. No.: 18/587,364

(22) Filed: Feb. 26, 2024

(65) Prior Publication Data
US 2024/0201239 A1    Jun. 20, 2024

Related U.S. Application Data

(63) Continuation of application No. PCT/EP2022/073586, filed on Aug. 24, 2022.

(30) Foreign Application Priority Data

Aug. 27, 2021  (EP) ..................... 21193583

(51) Int. Cl.
    *G01R 27/26*    (2006.01)

(52) U.S. Cl.
    CPC ...... *G01R 27/2611* (2013.01); *G01R 27/2605* (2013.01)

(58) Field of Classification Search
    CPC ................. G01R 27/2611; G01R 27/2605
    (Continued)

(56) References Cited

U.S. PATENT DOCUMENTS

| 4,219,740 A | 8/1980 | Little |
| 4,458,196 A | 7/1984 | Goyal et al. |

(Continued)

FOREIGN PATENT DOCUMENTS

| DE | 3117808 A1 | 11/1982 |
| DE | 3342378 A1 | 6/1985 |

(Continued)

OTHER PUBLICATIONS

Arkadiusz Kulka et al., "Grid Inductance Estimation by Reactive Power Perturbation for Sensor-less Scheme Based on Virtual Flux", Nordic Workshop on Power and Industrial Electronics, Nov. 6, 2008.

(Continued)

*Primary Examiner* — Arleen M Vazquez
(74) *Attorney, Agent, or Firm* — Bridgeway IP Law Group, PLLC; Jihun Kim

(57) ABSTRACT

Large-signal inductance measuring device for performing a measuring operation for measuring an inductance at an electrical energy supply line arrangement operated with a DC voltage, the large-signal inductance measuring device including: a disconnecting switch for electrically disconnecting the first conductor of the energy supply line arrangement; a first series circuit including a first capacitive arrangement and a first diode arrangement; a first measuring device for measuring a first change in voltage after the first conductor is disconnected; a second series circuit including (Continued)

a second capacitive arrangement and a second diode arrangement; a second measuring device for measuring a second change in voltage after the first conductor is disconnected; a third measuring device for measuring a third current on the first conductor before the first conductor is disconnected; and an evaluation device for evaluating the measured first change in voltage, the measured second change in voltage, and the measured third current.

17 Claims, 10 Drawing Sheets

(58) Field of Classification Search
USPC .......................................................... 324/654
See application file for complete search history.

(56) References Cited

U.S. PATENT DOCUMENTS

| | | | |
|---|---|---|---|
| 4,467,272 | A | 8/1984 | Hassler et al. |
| 8,795,652 | B1 | 8/2014 | Michal et al. |
| 2004/0080330 | A1* | 4/2004 | Kunikiyo ............ G01R 27/2611 |
| | | | 324/750.3 |
| 2014/0019075 | A1 | 1/2014 | Bai et al. |
| 2014/0028331 | A1 | 1/2014 | Bai et al. |
| 2019/0004108 | A1 | 1/2019 | Ott et al. |
| 2021/0396796 | A1* | 12/2021 | Sun ...................... G01R 15/181 |

FOREIGN PATENT DOCUMENTS

| | | |
|---|---|---|
| EP | 3422029 A1 | 1/2019 |
| FR | 1594736 A | 6/1970 |
| WO | 2020089462 A1 | 5/2020 |

OTHER PUBLICATIONS

Adrian V. Timbus et al., "Online Grid Impedance Measurement Suitable for Multiple PV Inverters Running in Parallel", Twenty-First Annual IEEE Applied Power Electronics Conference and Exposition, 2006.

* cited by examiner

LARGE-SIGNAL INDUCTANCE MEASURING DEVICE AND METHOD FOR PERFORMING A MEASURING OPERATION FOR MEASURING AN INDUCTANCE

CROSS-REFERENCES TO RELATED APPLICATIONS

This application is a continuation of copending International Application No. PCT/EP2022/073586, filed Aug. 24, 2022, which is incorporated herein by reference in its entirety, and additionally claims priority from European Application No. EP 21193583.8, filed Aug. 27, 2021, which is incorporated herein by reference in its entirety.

BACKGROUND OF THE INVENTION

For the layout of circuit breakers in DC applications, the switched inductive load is of great significance. If the circuit breaker is used in spatially vast systems, such as, for example, DC energy supply networks or DC energy supply lines, not only the actual load but also the inductance of the system play a vital role. Since these conductivities usually possess a non-linear portion, a simple small-signal measurement is insufficient for determining the actual load for the circuit breaker. Thus, a large-signal inductance measuring device, which measures the inductively stored energy acting on the circuit breaker, may be used.

Measuring inductances is generally known and is used for a variety of applications. Typically, however, these measurements are used for discrete inductances, such as chokes, for example. Moreover, in an impedance measurement, a small-signal measurement and a large-signal measurement may be distinguished. Small-signal measurements as described in [1] or [2], for example, impress a disturbance with a low amplitude onto the object to be examined and measure the response of the system to said disturbance. However, as inductances may comprise non-linearity, the behavior in case of a large-signal disturbance cannot be extrapolated from a small-signal disturbance. The complete separation of the current by means of the circuit breaker, however, is by definition a large-signal disturbance, which is why small-signal measurements cannot be used here.

Measurements of large-signal excitations are, for example, possible using the method for coupled coils shown in [3]. In this, an LC resonant circuit is excited and measured. The solution presented in [4], in which the oscillation is generated not by means of a resonant circuit, but rather by active switching of semiconductors, is similar. In both cases, however, the resonance cannot be readily excited in an extensive DC network since the power demand for the excitation would be very high. Moreover, it would not be possible to operate the network during the measurement, and the functioning of other participants in the network would be at least severely restricted. In [5], the measurement of discrete inductances via a reference measurement is described. However, for this measurement, a current may be impressed in parallel onto both the device under test and a reference inductance. As a DC network is vast and may have multiple feed points, this solution is not feasible for use in networks.

In AC networks, the measurement of the inductance of a network is well researched, and different methods are described in [6] or [7], for example. The network inductance in AC networks, however, is significantly less relevant for circuit breakers as during a period, the load current has two zero crossings in which an electric arc occurring in the circuit breaker may be extinguished. Most times, the inductance is thus examined only in relation to the stability of the network. Due to the sinusoidal flow of the current, the measuring methods are, moreover, not applicable to DC networks.

In [8], a measurement of the inductance in a DC network is presented. This measurement is performed in conjunction with a resistance measurement in order to check whether switching on to an ohmic inductive load causes any problems. However, the measurement is performed only on the load side. Here, the time response to an excitation in a small-signal range is measured. As described above, however, a small-signal measurement allows conclusions about the behavior in the large-signal range only to a limited extent.

SUMMARY

According to an embodiment, a large-signal inductance measuring device for performing a measuring operation for measuring an inductance at an electrical energy supply line arrangement operated with a DC voltage and having a first conductor and a second conductor, wherein the large-signal inductance measuring device is configured for arrangement between a first portion of the energy supply line arrangement, which is connected to an electrical energy source and includes a source-side part of the inductance, and a second portion of the energy supply line arrangement, which is connected to an electrical load and includes a load-side part of the inductance; may have: a disconnecting switch for electrically disconnecting the first conductor of the energy supply line arrangement; a first series circuit including a first capacitive arrangement and a first diode arrangement, wherein a first end of the first series circuit is electrically connected to the first conductor at a source-side side of the disconnecting switch, and which is configured such that, after disconnecting the first conductor, a first current caused by the source-side part of the inductance flows through the first series circuit, which current leads to a first change in voltage at the first capacitive arrangement; a first measuring device for measuring the first change in voltage; a second series circuit including a second capacitive arrangement and a second diode arrangement, wherein a first end of the second series circuit is electrically connected to the first conductor at a load-side side of the disconnecting switch, and which is configured such that, after disconnecting the first conductor, a second current caused by the load-side part of the inductance flows through the second series circuit, which current leads to a second change in voltage at the second capacitive arrangement; a second measuring device for measuring the second change in voltage; a third measuring device for measuring a third current on the first conductor before the first conductor is disconnected; and an evaluation device for evaluating the measured first change in voltage, the measured second change in voltage, and the measured third current in order to determine the source-side part of the inductance from the measured first change in voltage and from the measured third current, and in order to determine the load-side part of the inductance from the measured second change in voltage and from the measured third current.

According to another embodiment, a method for performing a measuring operation for measuring an inductance at an electrical energy supply line arrangement operated with DC voltage and having a first conductor and a second conductor, by means of a large-signal inductance measuring device, may have the steps of: arranging the large-signal inductance measuring device between a first portion of the energy supply line arrangement, which is connected to an electrical energy source and includes a source-side part of the inductance, and a second portion of the energy supply line arrangement, which is connected to an electrical load and includes a load-side part of the inductance; electrically disconnecting the first conductor of the energy supply line arrangement by means of a disconnecting switch; measuring a first change in voltage at a first capacitive arrangement by means of a first measuring device, wherein the first change in voltage is generated by means of a first series circuit including the first capacitive arrangement and a first diode arrangement, wherein a first end of the first series circuit is electrically connected to the first conductor at a source-side side of the disconnecting switch, and which is configured such that, after disconnecting the first conductor, a first current caused by the source-side part of the inductance flows through the first series circuit, which current leads to the first change in voltage at the first capacitive arrangement; measuring a second change in voltage at a second capacitive arrangement by means of a second measuring device, wherein the second change in voltage is generated by means of a second series circuit including the second capacitive arrangement and a second diode arrangement, wherein a first end of the second series circuit is electrically connected to the first conductor EL at a load-side side of the disconnecting switch, and which is configured such that, after disconnecting the first conductor, a second current caused by the load-side part of the inductance flows through the second series circuit, which current leads to the second change in voltage at the second capacitive arrangement; measuring, by means of a third measuring device, a third current on the first conductor before the first conductor is disconnected; and evaluating the measured first change in voltage, the measured second change in voltage, and the measured third current by means of an evaluation device in order to determine the source-side part of the inductance from the measured first change in voltage and from the measured third current, and in order to determine the load-side part of the inductance from the measured second change in voltage and from the measured third current.

The electrical energy supply line arrangement may be an electrical energy supply line or an electrical energy supply network. The first conductor may be a wire of a cable coated with insulating materials. Likewise, the second conductor may be a further wire of a cable coated with insulated materials. It is also conceivable that a ground connection or an earth connection is used as the second conductor.

The disconnecting switch is provided to electrically disconnect the first conductor at the location at which the circuit breaker to be laid out is to be installed later on. The disconnection of the first conductor by means of the disconnecting switch may be controlled by the evaluation device.

The diode arrangements may be either a single diode or a plurality of diodes which are connected in parallel and/or in series in order to increase the current rating and/or the electric strength of the respective diode arrangement.

The capacitive arrangements may be either a single capacitor or a plurality of capacitors which are connected in parallel and/or in series in order to increase the current rating and/or the electric strength of the respective capacitive arrangement.

The first measuring device is a voltage measuring device which is connected in parallel with the first capacitive arrangement.

The second measuring device is a voltage measuring device which is connected in parallel with the second capacitive arrangement.

The third measuring device is a current measuring device which is connected in series with the disconnecting switch.

The evaluation device may be a processor formed as hardware or as a combination of hardware and software.

The proposed large-signal inductance measuring device enables the performance of a measuring operation for measuring an inductance at an electrical energy supply line arrangement operated with a DC voltage, by means of a large-signal measurement at high speed and with a high degree of accuracy. Due to the separation of the source-side part of the inductance and the load-side part of the inductance, adapted solutions for overload protection can be designed on both sides of the circuit breaker (towards the energy source and towards the load).

The proposed large-signal inductance measuring device may be used for the layout of electronic, mechanical, or hybrid disconnecting switches for industrial DC networks, electric vehicle networks, DC charging infrastructure, or PV systems as well as for measuring these networks at different points. Moreover, it can be used for measuring the output inductance in DC charging stations, which plays an important role in the standard-compliant testing of DC charging stations.

According to an advantageous development of the invention, the first diode arrangement is polarized such that it is forward-biased before and after disconnecting.

According to a useful development of the invention, the second diode arrangement is polarized such that it is reverse-biased before disconnecting and forward-biased after disconnecting.

According to an advantageous development of the invention, the disconnecting switch includes one or multiple semiconductor switches. In principle, the disconnecting switch could also be formed as a mechanical switch. In this case, however, the formation of an electric arc, which corrupts the measurement, upon disconnection is inevitable. Using semiconductor switches avoids this drawback. The semiconductor switches may be connected in parallel and/or in series in order to increase the current rating and/or the electric strength of the disconnecting switch. The semiconductor switches may be, for example, MOSFETs, HEMTs, IGBTs, BJTs, or GTOs.

According to a useful development of the invention, a second end of the first series circuit is electrically connected to the second conductor of the energy supply line arrangement. Hereby, the energy stored in the magnetic field of the source-side part is transferred completely into the first capacitive arrangement which facilitates the evaluation of the first change in voltage.

According to an advantageous development of the invention, a second end of the first series circuit is electrically connected to the first conductor at the load-side side of the disconnecting switch. Hereby, the maximum voltage at the first series circuit is reduced as compared to the embodiments explained above, so that the requirements for the electric strength of its components are reduced.

According to a useful development of the invention, a second end of the first series circuit is electrically connected to an electrical connection between the second capacitive arrangement and the second diode arrangement. Hereby, the maximum voltage at the first series circuit is reduced as compared to the embodiments explained above, so that the requirements for the electric strength of its components are reduced.

According to an advantageous of the invention, a second end of the second series connection is electrically connected to the second conductor of the energy supply line arrangement. Hereby, the energy stored in the magnetic field of the load-side part is transferred completely into the second capacitive arrangement which facilitates the evaluation of the second change in voltage.

According to a useful development of the invention, a second end of the second series circuit is electrically connected to the first conductor at the source-side side of the disconnecting switch. Hereby, the maximum voltage at the second series circuit is reduced as compared to the embodiments explained above, so that the requirements for the electric strength of its components are reduced.

According to an advantageous development of the invention, a second end of the second series circuit is electrically connected to an electrical connection between the first capacitive arrangement and the first diode arrangement. Hereby, the maximum voltage at the second series circuit is reduced as compared to the embodiments explained above, so that the requirements for the electric strength of its components are reduced.

According to a useful development of the invention, the large-signal inductance measuring device comprises a discharging circuit which is configured to discharge the first capacitive arrangement after completion of the measuring operation, so that after completion of the measuring operation, a voltage applied to the first capacitive arrangement matches the voltage of the energy supply line arrangement. Hereby, the first capacitive arrangement can be returned to the original state after completion of the measuring operation, so that a further measuring operation is made possible. The discharging circuit may be controlled by the evaluation device.

According to an advantageous development of the invention, the first capacitive arrangement comprises a series circuit of first capacitors, wherein the discharging circuit is configured to individually discharge each of the first capacitors. Hereby, measuring errors can be prevented that could occur due to deviations of the capacities of the first capacitors from their nominal value.

According to a useful development of the invention, the large-signal inductance measuring device comprises a charging circuit which is configured to charge the second capacitive arrangement after completion of the measuring operation, so that after completion of the measuring operation, a voltage applied to the second capacitive arrangement matches the voltage of the energy supply line arrangement. Hereby, the second capacitive arrangement can be returned to the original state after completion of the measuring operation, so that a further measuring operation is made possible. The charging circuit may be controlled by the evaluation device.

According to an advantageous development of the invention, the second capacitive arrangement comprises a series circuit of second capacitors, wherein the charging circuit is configured to individually charge each of the second capacitors. Hereby, measuring errors can be prevented that could occur due to deviations of the capacities of the first capacitors from their nominal value.

According to a useful development of the invention, the large-signal inductance measuring device is configured to close the disconnecting switch after completion of the measuring operation. This way, a further measuring operation is made possible. The closing of the disconnecting switch may be controlled by the evaluation device.

According to an advantageous development of the invention, the large-signal inductance measuring device comprises a precharging circuit which is configured to charge the load before the disconnecting switch is closed provided that the load is capacitive. This way, high in-rush currents can be prevented. The precharging circuit may be arranged in parallel to the disconnecting switch and be controlled by the evaluation device.

In a further aspect, the object is achieved by a method for performing a measuring operation for measuring an inductance at an electrical energy supply line arrangement operated with DC voltage and having a first conductor and a second conductor, by means of a large-signal inductance measuring device, wherein the method includes:
  arranging the large-signal inductance measuring device between a first portion of the energy supply line arrangement, which is connected to an electrical energy source and comprises a source-side part of the inductance, and a second portion of the energy supply line arrangement, which is connected to an electrical load and comprises a load-side part of the inductance;
  electrically disconnecting the first conductor of the energy supply line arrangement by means of a disconnecting switch;
  measuring a first change in voltage at a first capacitive arrangement by means of a first measuring device, wherein the first change in voltage is generated by means of a first series circuit including the first capacitive arrangement and a first diode arrangement, wherein a first end of the first series circuit is electrically connected to the first conductor at a source-side side of the disconnecting switch, and which is configured such that, after disconnecting the first conductor, a first current caused by the source-side part of the inductance flows through the first series circuit, which current leads to the first change in voltage at the first capacitive arrangement;
  measuring a second change in voltage at a second capacitive arrangement by means of a second measuring device, wherein the second change in voltage is generated by means of a second series circuit including the second capacitive arrangement and a second diode arrangement, wherein a first end of the second series circuit is electrically connected to the first conductor at a load-side side of the disconnecting switch, and which is configured such that, after disconnecting the first conductor, a second current caused by the load-side part of the inductance flows through the second series circuit, which current leads to the second change in voltage at the second capacitive arrangement;
  measuring, by means of a third measuring device, a third current on the first conductor before the first conductor is disconnected; and
  evaluating the measured first change in voltage, the measured second change in voltage, and the measured third current by means of an evaluation device in order to determine the source-side part of the inductance from the measured first change in voltage and from the measured third current, and in order to determine the load-side part of the inductance from the measured second change in voltage and from the measured third current.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
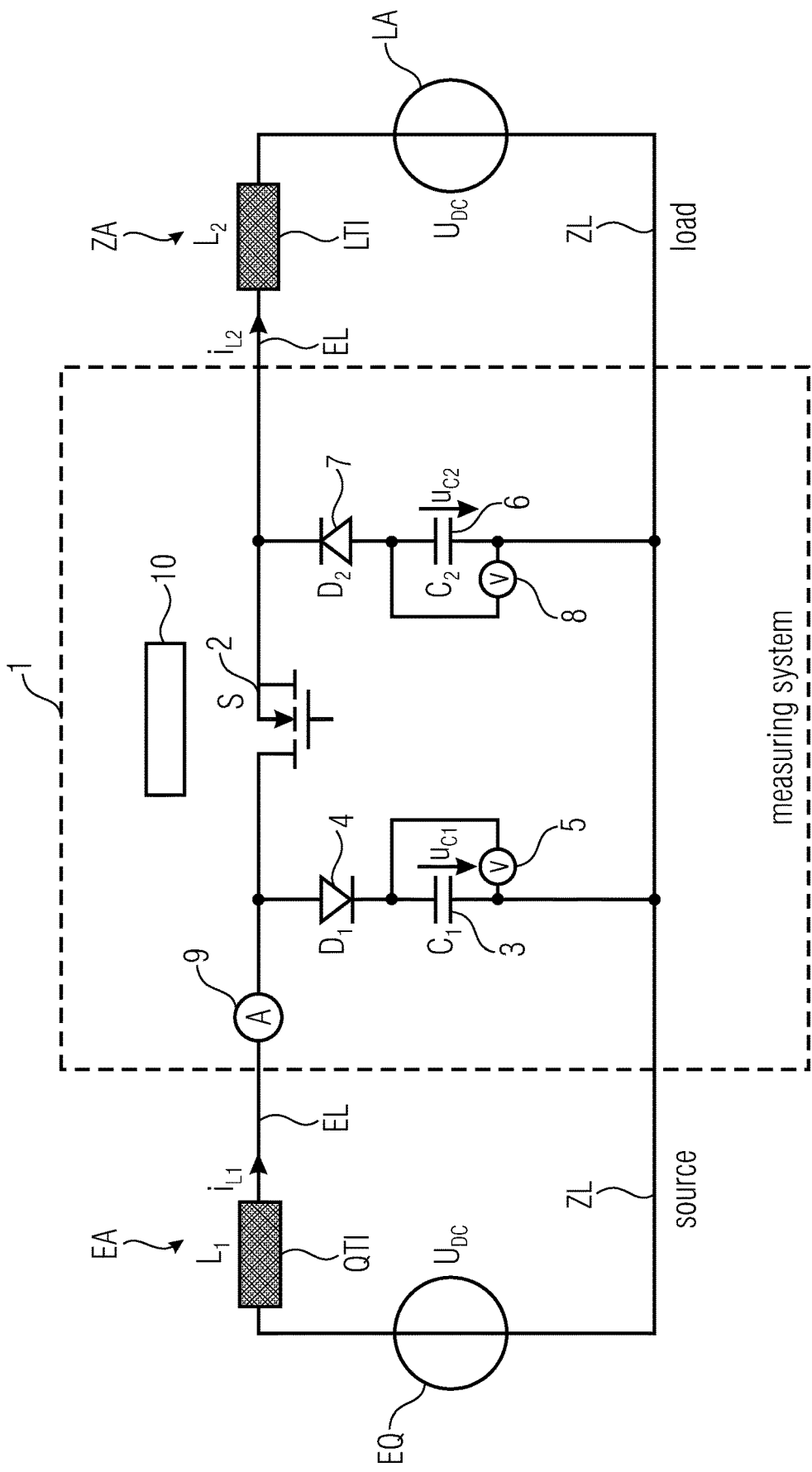
FIG. 1 shows a schematic representation of a first embodiment of a large-signal inductance measuring device according to the invention.

In the following, the same elements or elements having the same or equivalent function are provided with the same or equal reference numerals.

In the following description, embodiments are described in more detail using a variety of features of the present invention for the sake of better understanding the invention. However, it should be noted that the present invention may also be realized if individual ones of the features described are omitted. It should also be noted that the features shown in different embodiments may also be combined in different ways provided that this is not explicitly precluded or would lead to contradictions.

FIG. 1 shows a schematic representation of a first embodiment of a large-signal inductance measuring device 1 according to the invention. The large-signal inductance measuring device is configured to perform a measuring operation for measuring an inductance QTI, LTI at an electrical energy supply line arrangement EL, ZL operated with a DC voltage and having a first conductor EL and a second conductor ZL, wherein the large-signal inductance measuring device 1 is configured for arrangement between a first portion EA of the energy supply line arrangement EL, ZL, which is connected to an electrical energy source and comprises a source-side part of the inductance QTI, and a second portion ZA of the energy supply line arrangement EL, ZL, which is connected to an electrical load LA and comprises a load-side part of the inductance LTI. The large-signal inductance measuring device 1 includes:

- a disconnecting switch 2 for electrically disconnecting the first conductor EL of the energy supply line arrangement EL, ZL;
- a first series circuit 3, 4 including a first capacitive arrangement 3 and a first diode arrangement 4, wherein a first end of the first series circuit 3, 4 is electrically connected to the first conductor EL at a source-side side of the disconnecting switch 2, and which is configured such that, after disconnecting the first conductor EL, a first current EST caused by the source-side part of the inductance QTI flows through the first series circuit 3, 4, which current EST leads to a first change in voltage ESA at the first capacitive arrangement 3;
- a first measuring device 5 for measuring the first change in voltage ESA;
- a second series circuit 6, 7 including a second capacitive arrangement 6 and a second diode arrangement 7, wherein a first end of the second series circuit 6, 7 is electrically connected to the first conductor EL at a load-side side of the disconnecting switch 2, and which is configured such that, after disconnecting the first conductor EL, a second current ZST caused by the load-side part of the inductance LTI flows through the second series circuit 6, 7, which current ZST leads to a second change in voltage ZSA at the second capacitive arrangement 6;
- a second measuring device 8 for measuring the second change in voltage ZSA;
- a third measuring device 9 for measuring a third current STR on the first conductor EL before the first conductor EL is disconnected; and
- an evaluation device 10 for evaluating the measured first change in voltage ESA, the measured second change in voltage ZSA, and the measured third current STR in order to determine the source-side part of the inductance QTI from the measured first change in voltage ESA and from the measured third current STR, and in order to determine the load-side part of the inductance LTI from the measured second change in voltage ZSA and from the measured third current STR.

According to a useful development of the invention, the first diode arrangement 3 is polarized such that it is forward-biased before and after disconnecting.

According to an advantageous development of the invention, the second diode arrangement 7 is polarized such that it is reverse-biased before disconnecting and forward-biased after disconnecting.

According to a useful development of the invention, the disconnecting switch 2 includes one or multiple semiconductor switches.

According to an advantageous development of the invention, a second end of the first series circuit 3, 4 is electrically connected to the second conductor ZL of the energy supply line arrangement EL, ZL.

According to a useful development of the invention, a second end of the second series circuit 6, 7 is electrically connected to the second conductor ZL of the energy supply line EL, ZL.

The large-signal inductance measuring device 1 is designed to be bidirectional, wherein FIG. 1 shows the intended use of the large-signal inductance measuring device 1. In this regard, the large-signal inductance measuring device 1 is arranged between a first portion EA and a second portion ZA of an electrical energy supply line arrangement EL, ZL operated with a DC voltage and having a first conductor EL and a second conductor ZL. In this regard, the disconnecting switch 2 is interposed in the first conductor EL, while the second conductor is not interrupted.

The first series circuit 3, 4, which consists of the first capacitive arrangement 3 and the first diode arrangement 4, is electrically connected at a first end to the first conductor EL at the source-side side of the switch 2. The second end of the first series circuit 3, 4 is electrically connected to the second conductor ZL. In this, the first diode arrangement 4 is polarized such that it is forward-biased regardless of the switching state of the switch 2.

The second series circuit 6, 7, which consists of the second capacitive arrangement 6 and the second diode arrangement 7, is electrically connected at a first end to the first conductor EL at the load-side side of the switch. The second end of the second series circuit 6, 7 is electrically connected to the second conductor ZL. In this, the second diode arrangement 7 is polarized such that it is reverse-biased when the switch 2 is closed and forward-biased when the switch 2 is open.

An energy source EQ is connected to the first portion EA of the electrical energy supply line arrangement EL, ZL. In this regard, the inductances of the energy source EQ and the first portion EA of the energy supply line arrangement EL, ZL form the source-side part of the inductance QTI. An electrical load LA is connected to the second portion ZA of the electrical energy supply line arrangement EL, ZL. In this regard, the inductances of the electrical load LA and of the second portion ZA of the energy supply line arrangement EL, ZL form the load-side part of the inductance LTI.

The large-signal measuring device now allows for the performance of measuring operations for measuring the source-side part of the inductance QTI and for measuring the load-side part of the inductance LTI. During a measuring operation, the disconnecting switch 2 is initially in a closed state, at least until the entire arrangement is in a settled state. In this, the third current STR on the first conductor EL is measured using the third measuring device 9. The third measuring device 9 may be located at any location of the first conductor.

Then, the disconnecting switch 2 is opened, so that the source-side portion of the first conductor EL and the load-side portion of the first conductor EL are no longer directly connected to one another, so that the current flow between the energy source EQ and the load LA is interrupted. Due to the energy stored in the magnetic field of the source-side part of the inductance QTI, a temporary first current EST through the first series circuit 3, 4 develops, which leads to a first change in voltage ESA at the first capacitive arrangement 3. This first change in voltage ESA is measured by means of the first measuring device 5. Due to the energy stored in the magnetic field of the load-side part of the inductance LTI, furthermore, a temporary second current ZST through the second series circuit 6, 7 develops, which leads to a second change in voltage ZSA at the second capacitive arrangement 6. This second change in voltage ZSA is measured by means of the second measuring device 8.

In this, the value $u_{C1}$ of the electrical voltage at the first capacitive arrangement 3 rises beyond the value $U_{DC}$ of the voltage of the energy source EQ, whereupon the value $i_{L1}$ of the first current EST decreases until it becomes zero and the diode arrangement 4 prevents a further decrease of the first current EST.

The energy $E_{L1}$ stored in the source-side part of the inductance QTI can be calculated from the value $\Delta u_{C1}$ of the first change in voltage ESA according to equation (1), wherein $C_1$ is the capacity of the first capacitive arrangement. The value $L_{eq1}$ of the equivalent linear inductance, which at the same current stores the same energy, can be calculated according to equation (2).

$$E_{L1} = \frac{1}{2} C_1 \cdot (\Delta u_{C1})^2 \quad (1)$$

$$L_{eq1} = \frac{2 E_{L1}}{(i_{L1}(t_0))^2} \quad (2)$$

The second current ZST flowing towards the load and having the value $i_{L2}$ commutates from disconnecting switch 2 to the second series circuit 6, 7. The energy $E_{L2}$ stored in the load-side part of the inductance LTI can be calculated from the value $\Delta u_{C2}$ of the second change in voltage ZSA according to equation (3), wherein $C_2$ is the capacity of the second capacitive arrangement. Here, as well, the value $L_{eq2}$ of the equivalent linear inductance can be determined according to equation (4).

$$E_{L2} = \frac{1}{2} C_2 \cdot (\Delta u_{C2})^2 \quad (3)$$

$$L_{eq2} = \frac{2 E_{L2}}{(i_{L2}(t_0))^2} \quad (4)$$

The sum of both energies $E_{L1}$ and $E_{L2}$ corresponds to the energy which has to be converted in the electric arc of a mechanical circuit breaker that is installed at the position of the large-signal inductance measuring device 1. Due to the separation of the two inductances QTI and LTI, adapted solutions for overload protection can be designed on both sides of the circuit breaker (towards the energy source and towards the load).

In a further aspect, the invention relates to a method for performing a measuring operation for measuring an inductance QTI, LTI at an electrical energy supply line arrangement EL, ZL operated with DC voltage and having a first conductor EL and a second conductor ZL, by means of a large-signal inductance measuring device 1. The method comprises:

arranging the large-signal inductance measuring device 1 between a first portion EA of the energy supply line arrangement EL, ZL, which is connected to an electrical energy source EQ and comprises a source-side part of the inductance QTI, and a second portion ZA of the energy supply line arrangement EL, ZL, which is connected to an electrical load LA and comprises a load-side part of the inductance LTI;

electrically disconnecting the first conductor EL of the energy supply line arrangement EL, ZL by means of a disconnecting switch 2;

measuring a first change in voltage ESA at a first capacitive arrangement 3 by means of a first measuring device 5, wherein the first change in voltage ESA is generated by means of a first series circuit 3, 4 including the first capacitive arrangement 3 and a first diode arrangement 4, wherein a first end of the first series circuit 3, 4 is electrically connected to the first conductor EL at a source-side side of the disconnecting switch 2, and which is configured such that, after disconnecting the first conductor EL, a first current EST caused by the source-side part of the inductance QTI flows through the first series circuit 3, 4, which current EST leads to the first change in voltage ESA at the first capacitive arrangement 3;

measuring a second change in voltage ZSA at a second capacitive arrangement 6 by means of a second measuring device 8, wherein the second change in voltage ZSA is generated by means of a second series circuit 6, 7 including the second capacitive arrangement 6 and a second diode arrangement 7, wherein a first end of the second series circuit 6, 7 is electrically connected to the first conductor EL at a load-side side of the disconnecting switch 2, and which is configured such that, after disconnecting the first conductor EL, a second current ZST caused by the load-side part of the inductance LTI flows through the second series circuit 6, 7, which current ZST leads to the second change in voltage ZSA at the second capacitive arrangement 6;

measuring, by means of a third measuring device 9, a third current STR on the first conductor EL before the first conductor EL is disconnected; and evaluating the measured first change in voltage ESA, the measured second change in voltage ZSA, and the measured third current STR by means of an evaluation device 10 in order to determine the source-side part of the inductance QTI from the measured first change in voltage ESA and from the measured third current STR, and in order to determine the load-side part of the inductance LTI from the measured second change in voltage ZSA and from the measured third current STR.

Figure 2:
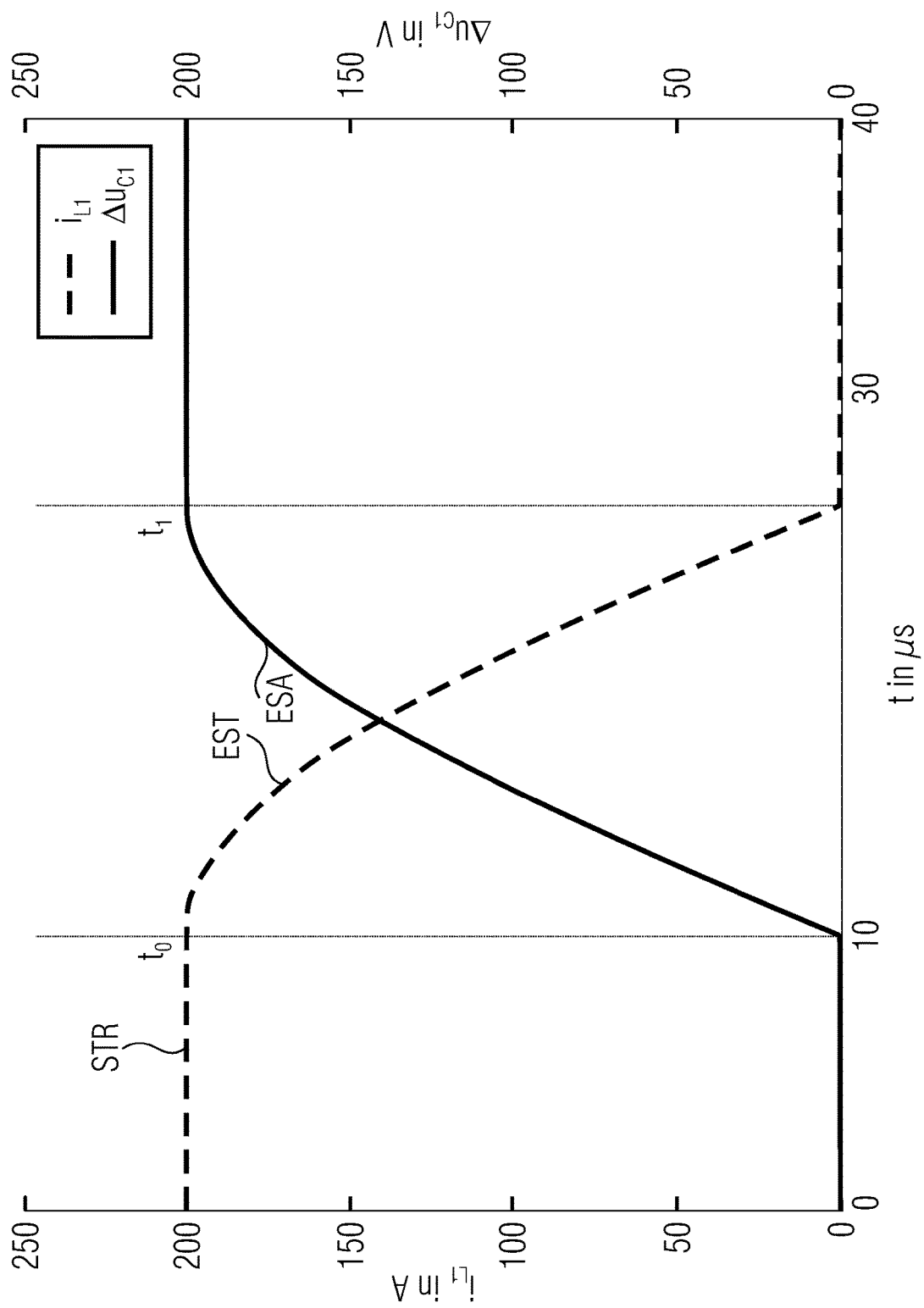
FIG. 2 shows a temporal progress of a current in the source-side part of the inductance as well as the temporal progress of a first change in voltage at the first capacitive arrangement.

FIG. 2 shows a temporal progress of a current STR, EST in the source-side part of the inductance QTI as well as the temporal progress of a first change in voltage ESA at the first capacitive arrangement 3, wherein the disconnecting switch 2 is opened at the time $t_0$. At the time $t_1$, the first change in voltage ESA is completed.

Figure 3:
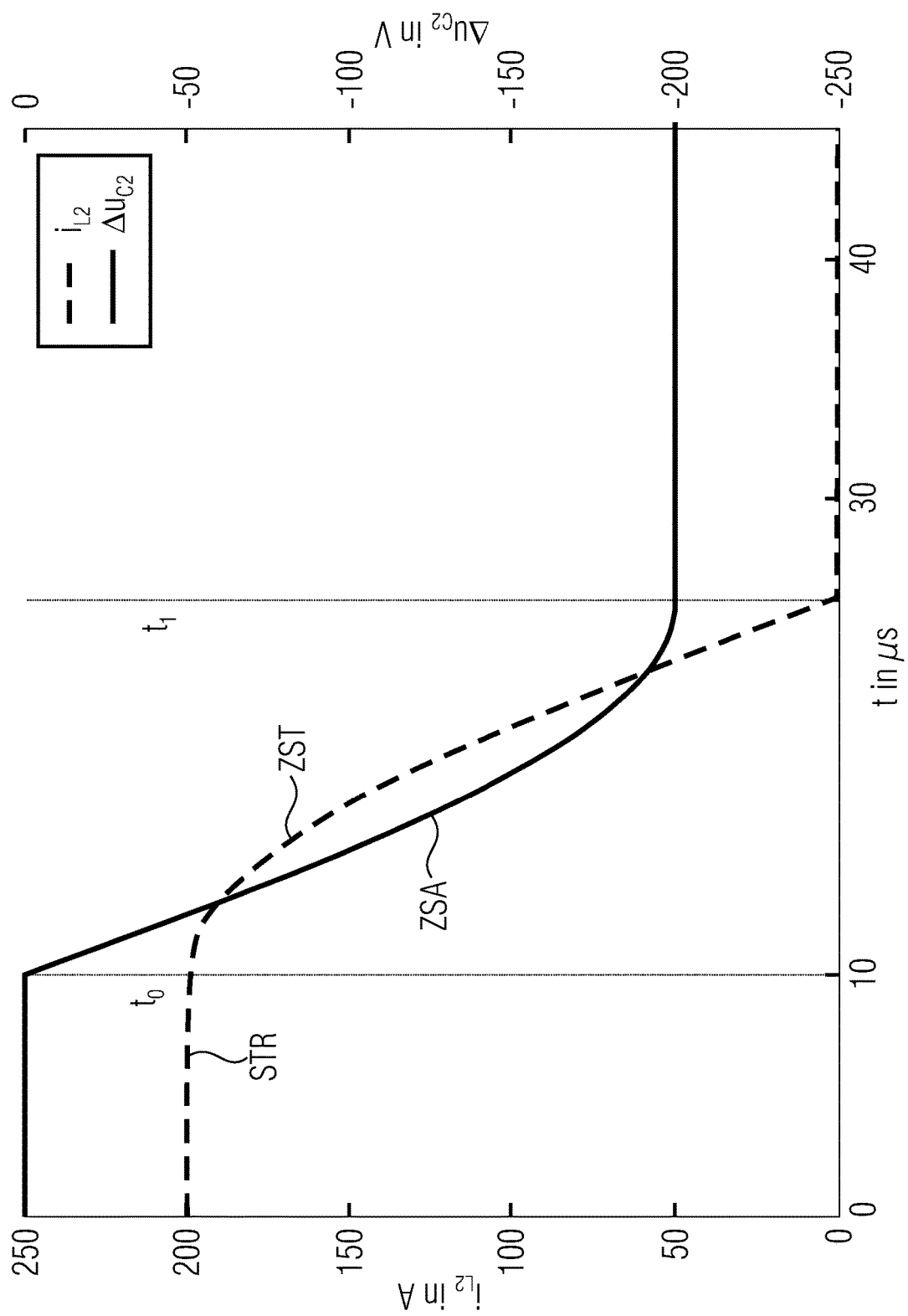
FIG. 3 shows a temporal progress of a current in the load-side part of the inductance as well as the temporal progress of a second change in voltage at the second capacitive arrangement.

FIG. 3 shows a temporal progress of a current STR, ZST in the load-side part of the inductance LTI as well as the temporal progress of a second change in voltage ZSA at the second capacitive arrangement 6, wherein the disconnecting switch 2 is opened at the time $t_0$. At the time $t_1$, the second change in voltage ZSA is completed.

Figure 4:
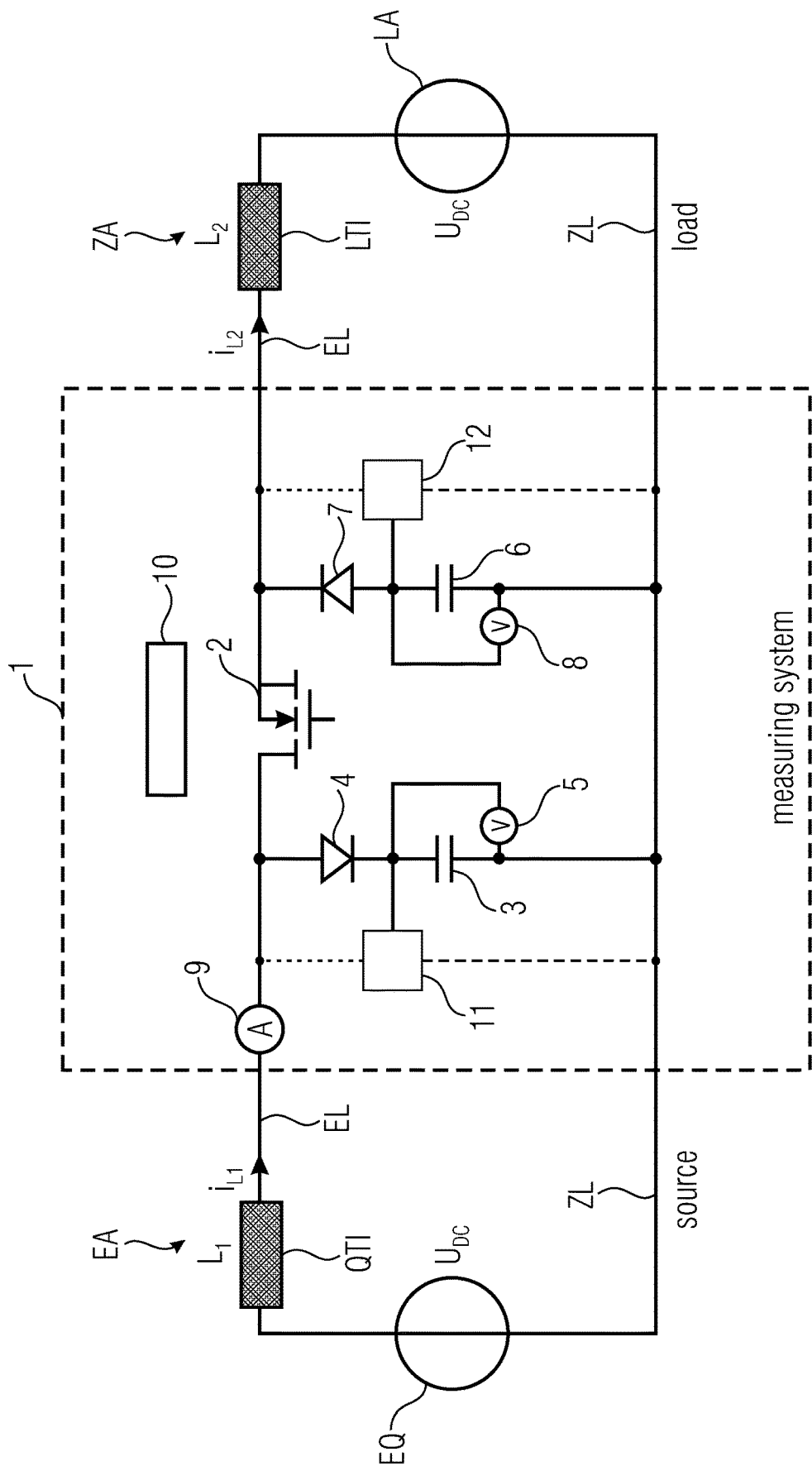
FIG. 4 shows a schematic representation of a second embodiment of a large-signal inductance measuring device according to the invention.

FIG. 4 shows a schematic representation of a second embodiment of a large-signal inductance measuring device 1 according to the invention. The second embodiment is based on the first embodiment, wherein only the differences are explained in the following.

According to an advantageous development of the invention, the large-signal inductance measuring device 1 comprises a discharging circuit 11, which is configured to discharge the first capacitive arrangement 3 after completion of the measuring operation, so that after completion of the measuring operation, a voltage applied to the first capacitive arrangement 3 matches the voltage of the energy supply line arrangement EL, ZL.

According to a useful development of the invention, the large-signal inductance measuring device 1 comprises a charging circuit 12, which is configured to charge the second capacitive arrangement 6 after completion of the measuring operation, so that after completion of the measuring operation, a voltage applied to the second capacitive arrangement 6 matches the voltage of the energy supply line arrangement EL, ZL.

According to an advantageous development of the invention, the large-signal inductance measuring device 1 is configured to close the disconnecting switch 2 after completion of the measuring operation.

In order to be able to perform multiple measuring operations successively, the large-signal inductance measuring device 1 may be returned to its original state after the measuring operation. This means that the voltages on the first capacitive arrangement 3 and the second capacitive arrangement 6 may match the voltage of the energy source EQ again. The decrease of the voltage in the first capacitive arrangement 3, however, is prevented by the first diode arrangement 4. Hence, a discharging circuit 11 is provided which reduces the voltage at the first capacitive arrangement 3. Likewise, an increase of the voltage at the second capacitive arrangement is prevented by the second diode arrangement 7. Hence, an additional charging circuit 12 is provided. The general circuitry is represented in FIG. 4.

In the basic design, the discharging circuit 11 is connected to a connection between the first diode arrangement 4 and the first capacitive arrangement 3. Moreover, it may be connected to the first conductor EL and/or the second conductor ZL. The simplest design of a discharging circuit is a sufficiently great resistor which slowly discharges the first capacitive arrangement 3 after the measuring operation. However, more complex circuits such as, for example, a combination of a resistor and a diode, a resistor and a switch (mechanical or semiconductor-based), or even complex DC/DC converters, are also possible. These circuits, however, share the object of transferring the first capacitive arrangement 3 back into the original state. The same applies to the charging circuit 12 which may also have a design of any desired complexity and has the object of transferring the second capacitive arrangement 6 back into its original state. It is connected to a connection between the second diode arrangement 7 and the second capacitive arrangement 6. Moreover, it may be connected to the first conductor EL and/or the second conductor ZL.

Figure 5:
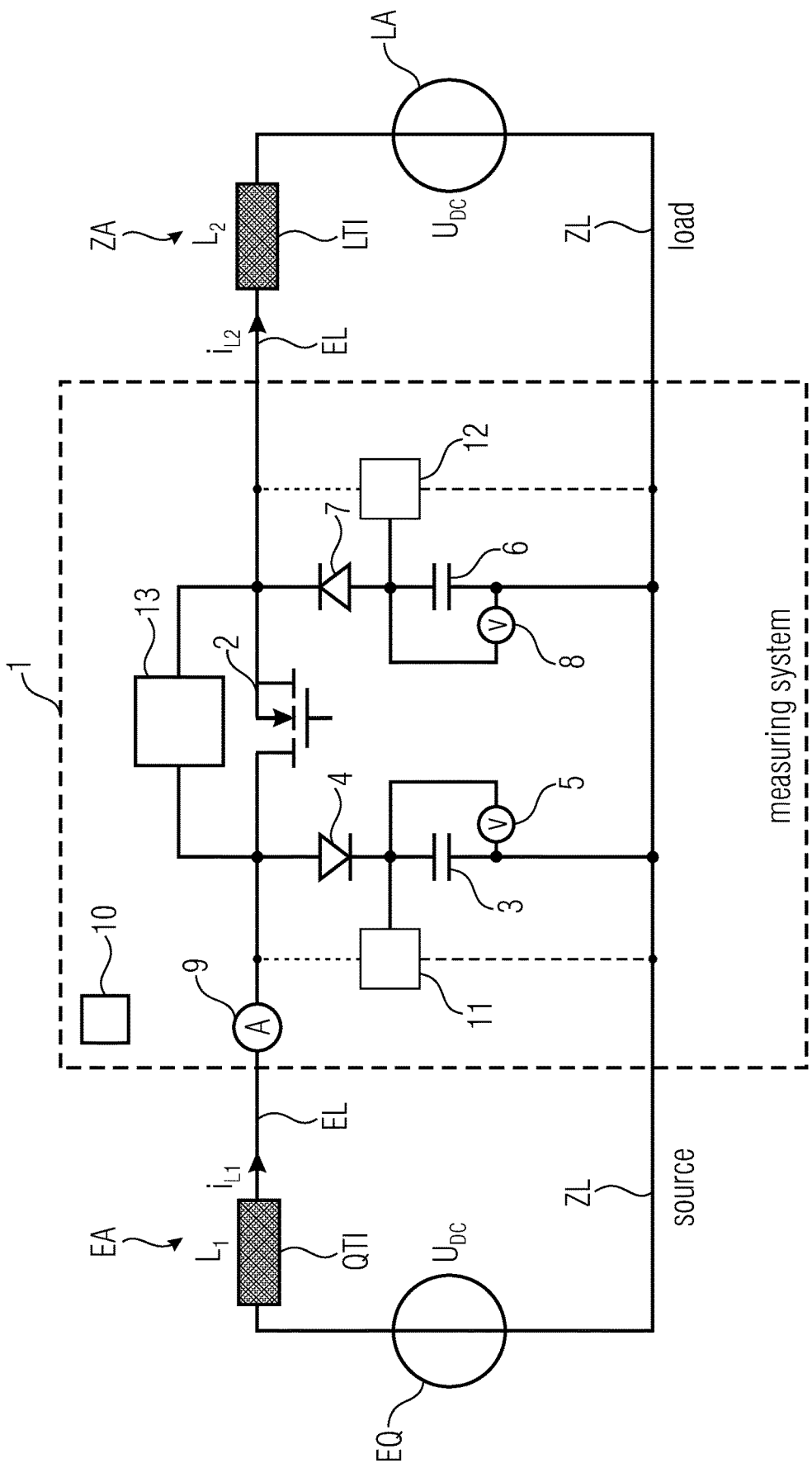
FIG. 5 shows a schematic representation of a third embodiment of a large-signal inductance measuring device according to the invention.

FIG. 5 shows a schematic representation of a third embodiment of a large-signal inductance measuring device 1 according to the invention.

According to a useful development of the invention, the large-signal inductance measuring device 1 comprises a precharging circuit 13 which is configured to charge the load LA before the disconnecting switch 2 is closed provided that the load is capacitive.

In addition to transferring the first capacitive arrangement 3 and the second capacitive arrangement 6 back into their original states, it may also be needed to precharge the load LA to the voltage of the energy source EQ before a further measuring operation can be performed. In some cases, this may be facilitated by switching the disconnecting switch 2. However, if the load LA is strongly capacitive, a simple switching on of the disconnecting switch 2 may lead to very high in-rush currents. In order to limit these, the measuring circuit may be supplemented by a precharging circuit 13 shown in FIG. 5, which is arranged parallel to the disconnecting switch. This precharging circuit 13, as well, may have a design of any desired complexity. However, its object is to adapt the voltage at the load LA to the voltage at the energy source EQ.

Figure 6:
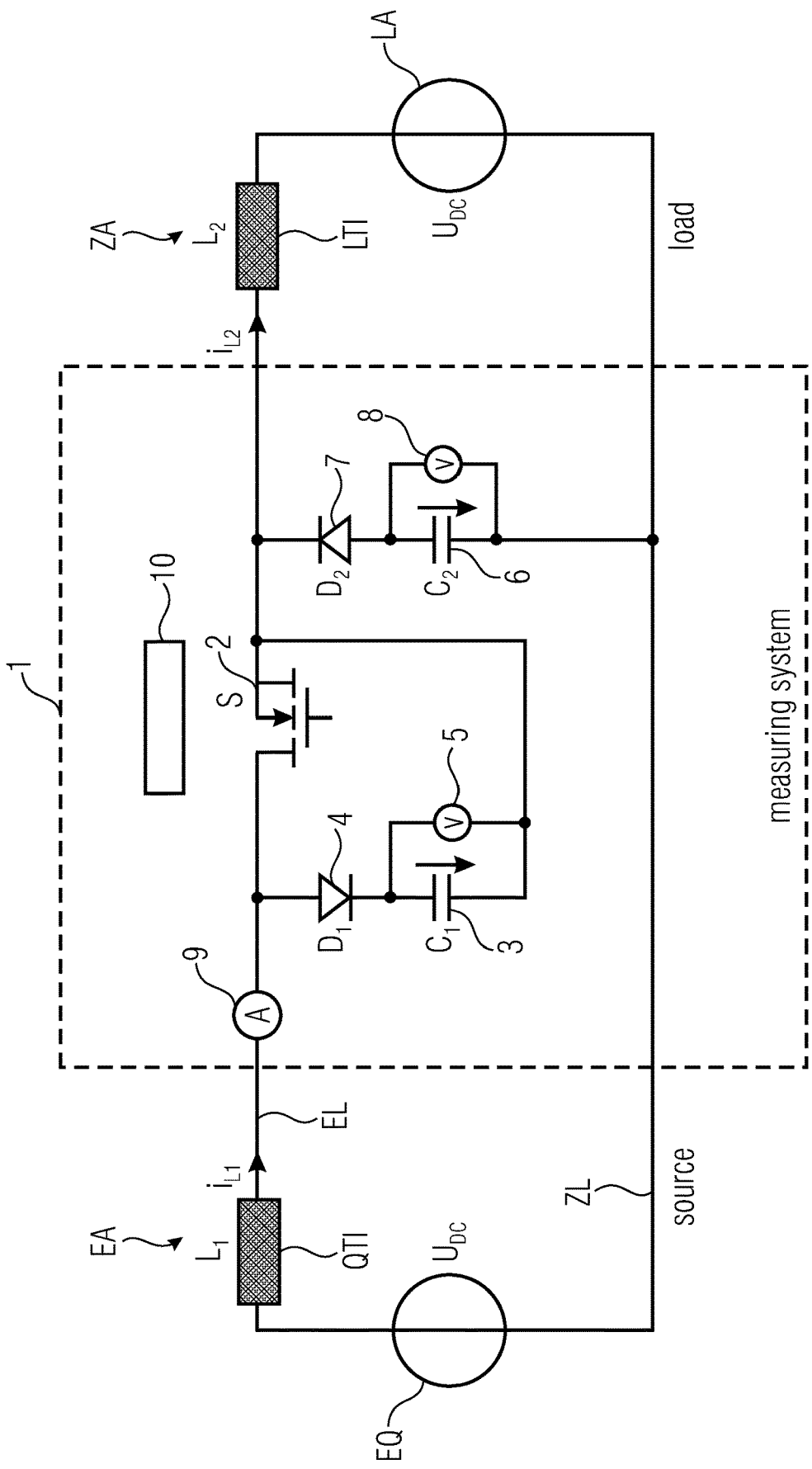
FIG. 6 shows a schematic representation of a fourth embodiment of a large-signal inductance measuring device according to the invention.

FIG. 6 shows a schematic representation of a fourth embodiment of a large-signal inductance measuring device 1 according to the invention. The fourth embodiment is based on the first embodiment, wherein only the differences are explained in the following.

According to a useful development of the invention, a second end of the first series circuit 3, 4 is electrically connected to the first conductor EL at the load-side side of the disconnecting switch 2.

Figure 7:
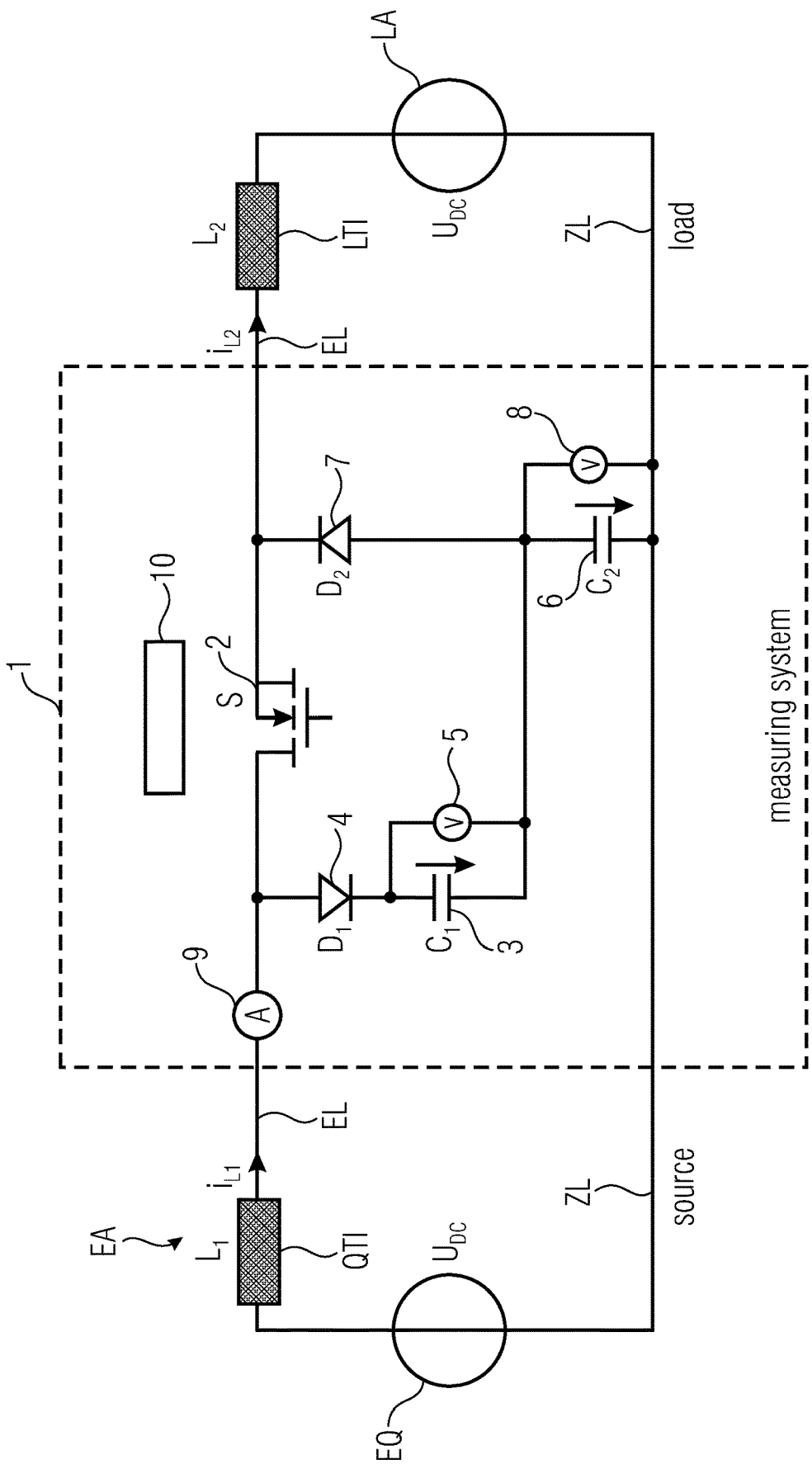
FIG. 7 shows a schematic representation of a fifth embodiment of a large-signal inductance measuring device according to the invention.

FIG. 7 shows a schematic representation of a fifth embodiment of a large-signal inductance measuring device 1 according to the invention. The fifth embodiment is based on the first embodiment, wherein only the differences are explained in the following.

According to an advantageous development of the invention, a second end of the first series circuit 3, 4 is electrically connected to an electrical connection between the second capacitive arrangement 6 and the second diode arrangement 7.

In the fourth and fifth embodiments, the maximum voltage at the first series circuit 3, 4 is reduced with respect to the embodiments explained above, so that the requirements for the electric strength of its components are lowered.

Figure 8:
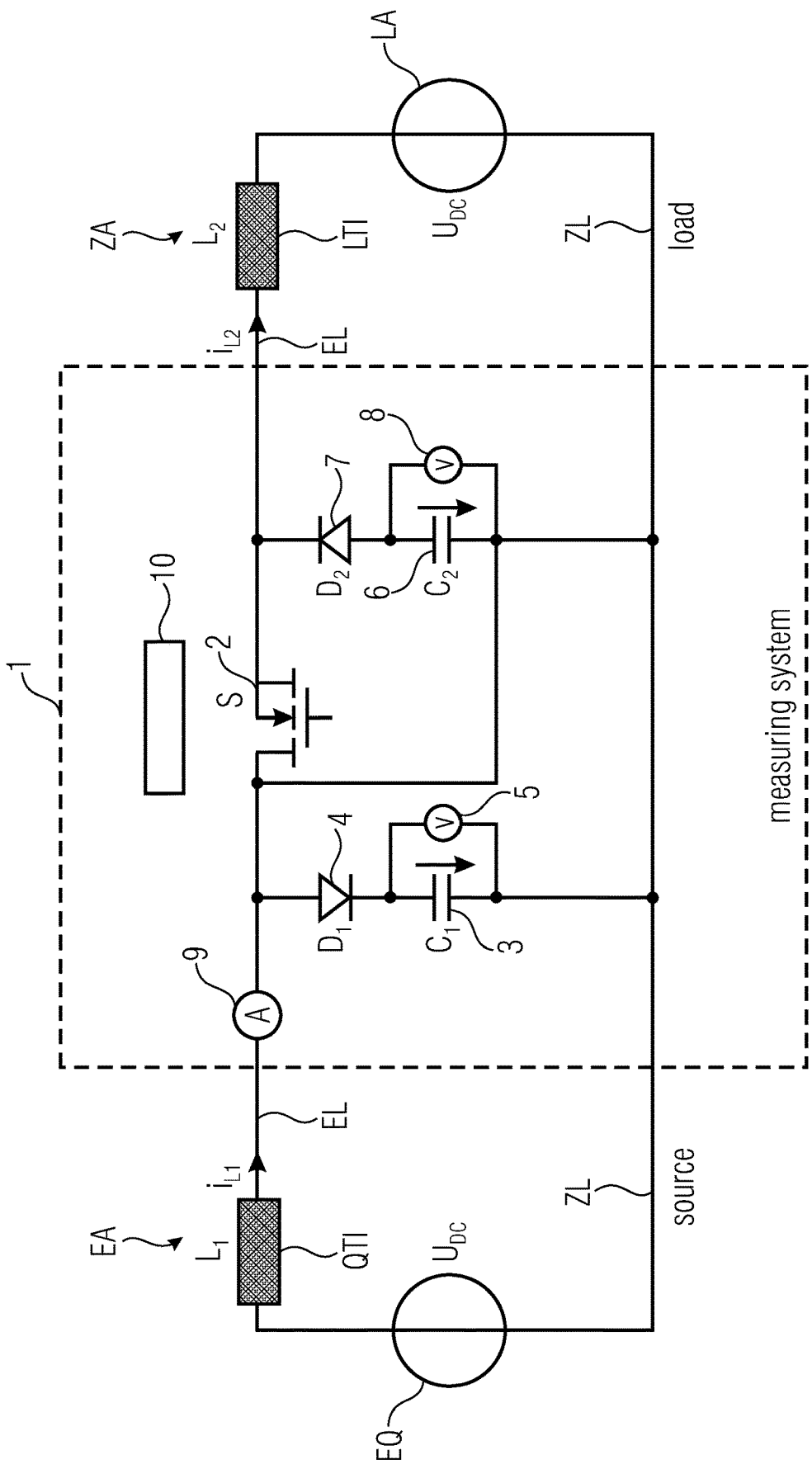
FIG. 8 shows a schematic representation of a sixth embodiment of a large-signal inductance measuring device according to the invention.

FIG. 8 shows a schematic representation of a sixth embodiment of a large-signal inductance measuring device 1 according to the invention. The sixth embodiment is based on the first embodiment, wherein only the differences are explained in the following.

According to an advantageous development of the invention, a second end of the second series circuit 6, 7 is electrically connected to the first conductor EL at the source-side side of the disconnecting switch 2.

Figure 9:
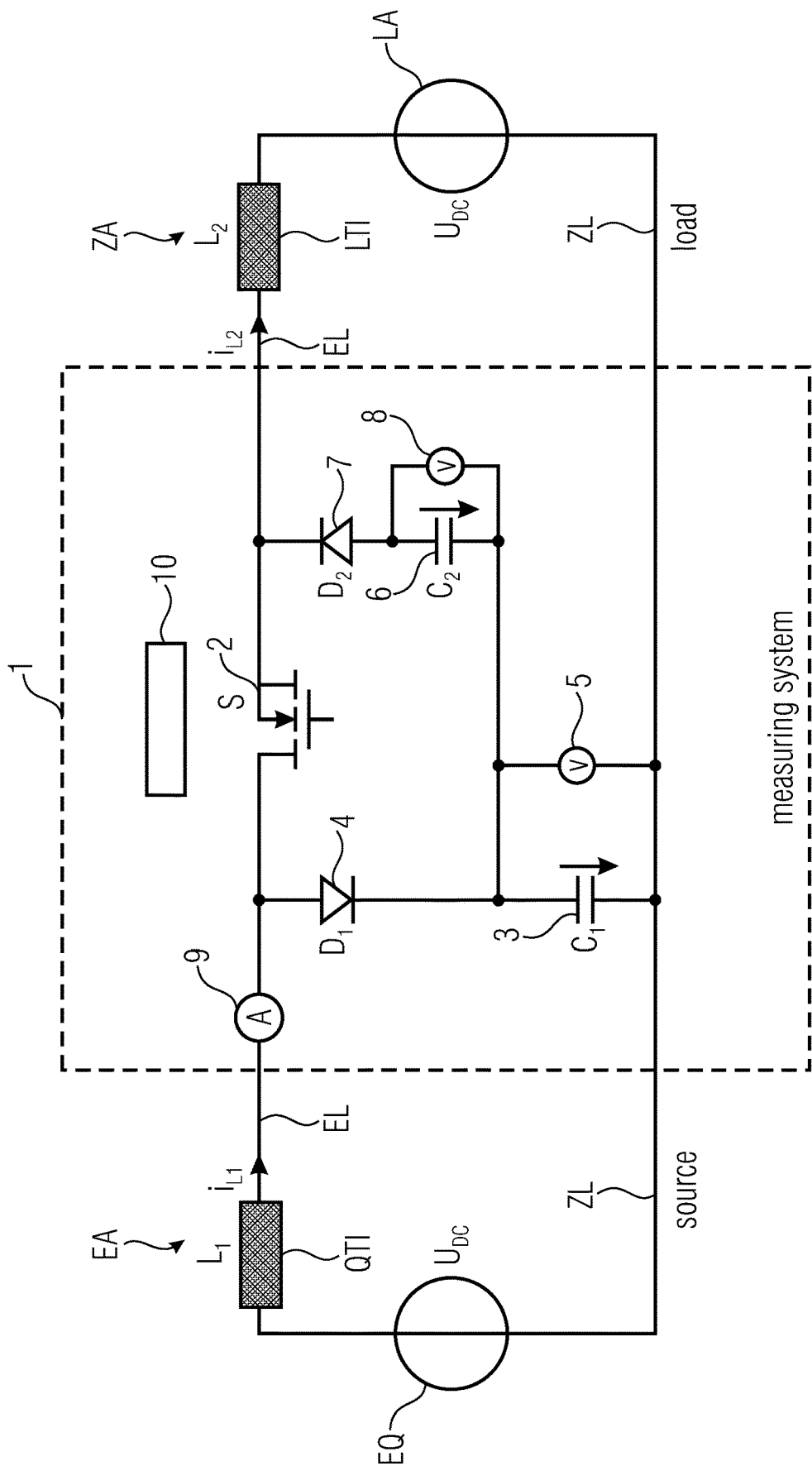
FIG. 9 shows a schematic representation of a seventh embodiment of a large-signal inductance measuring device according to the invention.

FIG. 9 shows a schematic representation of a seventh embodiment of a large-signal inductance measuring device 1 according to the invention. The seventh embodiment is based on the first embodiment, wherein only the differences are explained in the following.

According to a useful development of the invention, a second end of the second series circuit 6, 7 is electrically connected to an electrical connection between the first capacitive arrangement 3 and the first diode arrangement 4.

In the sixth and seventh embodiments, the maximum voltage at the second series circuit 6, 7 is reduced with respect to the embodiments explained above, so that the requirements for the electric strength of its components are lowered.

Figure 10:
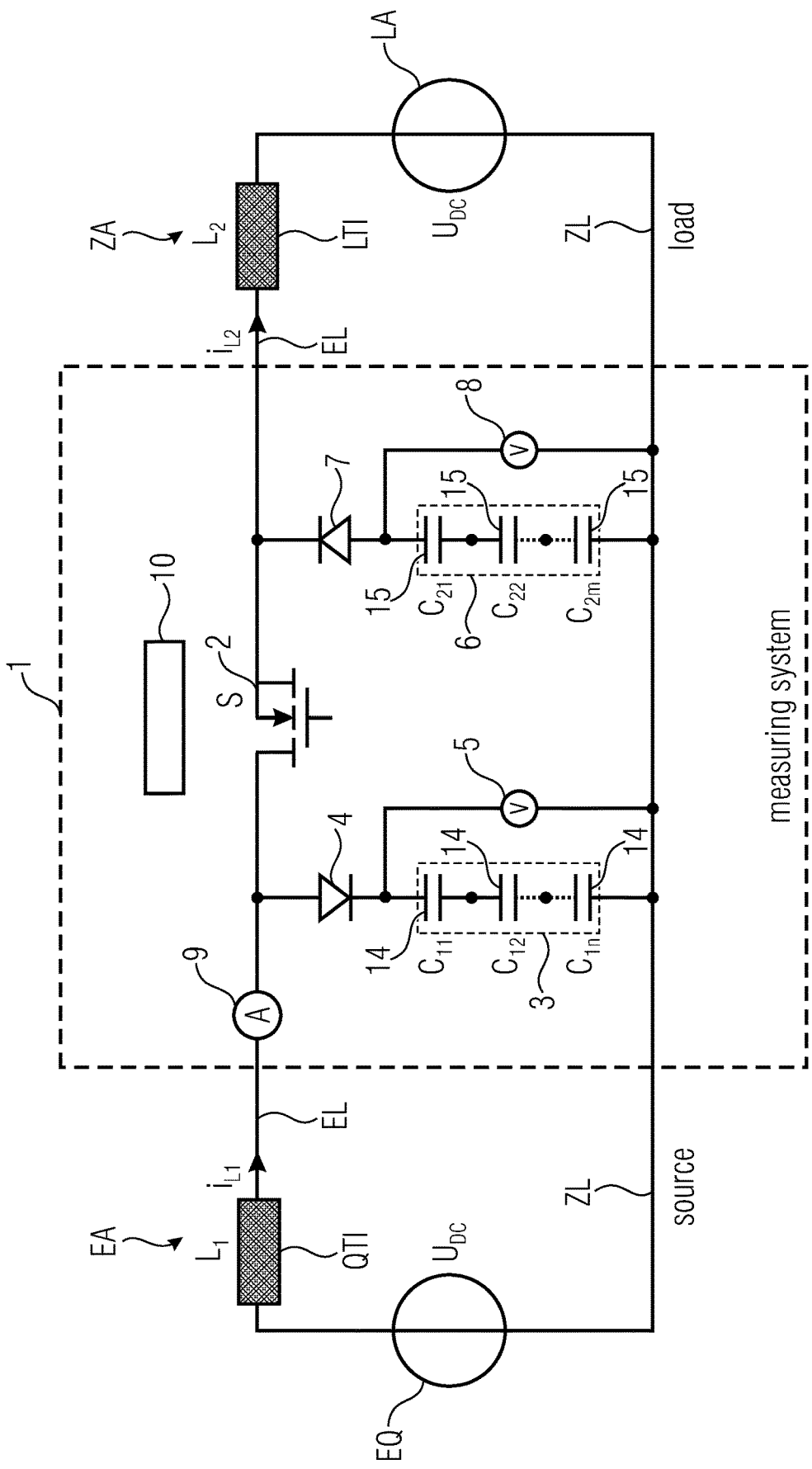
FIG. 10 shows a schematic representation of an eighth embodiment of a large-signal inductance measuring device according to the invention.

FIG. 10 shows a schematic representation of an eighth embodiment of a large-signal inductance measuring device 1 according to the invention. The eighth embodiment is based on the first embodiment, wherein only the differences are explained in the following. The discharging circuit 11 and the charging circuit 12 are not shown due to a lack of space.

According to a useful development of the invention, the first capacitive arrangement 3 includes a series circuit of first capacitors 14, wherein the discharging circuit 11 is configured to individually discharge each of the first capacitors 14.

According to a useful development of the invention, the second capacitive arrangement 6 includes a series circuit of second capacitors 15, wherein the charging circuit 12 is configured to individually charge each of the second capacitors 15.

If the first capacitive arrangement 3 includes a series circuit of first capacitors 14 and/or if the second capacitive arrangement 6 includes a series circuit of second capacitors 15, a further optimization potential arises. For example, the possibility to act, in a targeted manner, on the potentials between the first capacitors 14 connected in series by means of the discharging circuit 11 arises. Likewise, the possibility to act, in a targeted manner, on the potentials between the second capacitors 15 connected in series by means of the charging circuit 12 arises. For this purpose, the discharging circuit 11 is connected to each electrode of the first capacitors 14 and optionally to the first conductor EL and/or the second conductor ZL. Analogously, the charging circuit 12 is connected to each electrode of the second capacitors 15 and optionally to the first conductor EL and/or the second conductor ZL.

Aspects of the invention described in the context of a device also relate to corresponding methods. Inversely, those aspects of the invention described in the context of a method also related to a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

SOURCES

[1] U.S. Pat. No. 4,458,196 A.
[2] EP 3 422 029 A1.
[3] US 2014/0019075 A1.
[4] DE 3342378 A1.
[5] US 2014/0028331 A1.
[6] A. Kulka und T. Underland, Grid Inductance Estimation by Reactive Power Perturbation", Nordic Workshop on Power and Industrial Electronics, Nov. 6, 2008.
[7] A. Timbus, R. Teodorescu und F. Blaabjerg, Online Grid Impedance Measurement Suitable for Multiple PV Inverters Running in Parallel," Twenty-First Annual IEEE Applied Power Electronics Conference and Exposition, 2006.
[8] U.S. Ser. No. 10/587,95652 B2.

The invention claimed is:

1. A large-signal inductance measuring device for performing a measuring operation for measuring an inductance at an electrical energy supply line arrangement operated with a DC voltage and comprising a first conductor and a second conductor, wherein the large-signal inductance measuring device is configured for arrangement between a first portion of the energy supply line arrangement, which is connected to an electrical energy source and comprises a source-side part of the inductance, and a second portion of the energy supply line arrangement, which is connected to an electrical load and comprises a load-side part of the inductance; the large-signal inductance measuring device comprising:

a disconnecting switch for electrically disconnecting the first conductor of the energy supply line arrangement;

a first series circuit comprising a first capacitive arrangement and a first diode arrangement, wherein a first end of the first series circuit is electrically connected to the first conductor at a source-side side of the disconnecting switch, and which is configured such that, after disconnecting the first conductor, a first current caused by the source-side part of the inductance flows through the first series circuit, which current leads to a first change in voltage at the first capacitive arrangement;

a first measuring device for measuring the first change in voltage;

a second series circuit comprising a second capacitive arrangement and a second diode arrangement, wherein a first end of the second series circuit is electrically connected to the first conductor at a load-side side of the disconnecting switch, and which is configured such that, after disconnecting the first conductor, a second current caused by the load-side part of the inductance flows through the second series circuit, which current leads to a second change in voltage at the second capacitive arrangement;

a second measuring device for measuring the second change in voltage;

a third measuring device for measuring a third current on the first conductor before the first conductor is disconnected; and an evaluation device for evaluating the measured first change in voltage, the measured second change in voltage, and the measured third current in order to determine the source-side part of the inductance from the measured first change in voltage and from the measured third current, and in order to determine the load-side part of the inductance from the measured second change in voltage and from the measured third current.

2. The large-signal inductance measuring device according to claim 1, wherein the first diode arrangement is polarized such that it is forward-biased before and after disconnecting.

3. The large-signal inductance measuring device according to claim 1, wherein the second diode arrangement is polarized such that it is reverse-biased before disconnecting and forward-biased after disconnecting.

4. The large-signal inductance measuring device according to claim 1, wherein the disconnecting switch comprises one or several semiconductor switches.

5. The large-signal inductance measuring device according to claim 1, wherein a second end of the first series circuit is electrically connected to the second conductor of the energy supply line arrangement.

6. The large-signal inductance measuring device according to claim 1, wherein a second end of the first series circuit is electrically connected to the first conductor at the load-side side of the disconnecting switch.

7. The large-signal inductance measuring device according to claim 1, wherein a second end of the first series circuit is electrically connected to an electrical connection between the second capacitive arrangement and the second diode arrangement.

8. The large-signal inductance measuring device according to claim 1, wherein a second end of the second series circuit is electrically connected to the second conductor of the energy supply line arrangement.

9. The large-signal inductance measuring device according to claim 1, wherein a second end of the second series circuit is connected to the first conductor at the source-side side of the disconnecting switch.

10. The large-signal inductance measuring device according to claim 1, wherein a second end of the second series circuit is electrically connected to an electrical connection between the first capacitive arrangement and the first diode arrangement.

11. The large-signal inductance measuring device according to claim 1, wherein the large-signal inductance measuring device comprises a discharging circuit which is configured to discharge the first capacitive arrangement after completion of the measuring operation, so that after completion of the measuring operation, a voltage applied to the first capacitive arrangement matches the voltage of the energy supply line arrangement.

12. The large-signal inductance measuring device according to claim 1, wherein the first capacitive arrangement comprises a series circuit of first capacitors, wherein the discharging circuit is configured to individually discharge each of the first capacitors.

13. The large-signal inductance measuring device according to claim 1, wherein the large-signal inductance measuring device comprises a charging circuit which is configured to charge the second capacitive arrangement after completion of the measuring operation, so that after completion of the measuring operation, a voltage applied to the second capacitive arrangement matches the voltage of the energy supply line arrangement.

14. The large-signal inductance measuring device according to claim 1, wherein the second capacitive arrangement comprises a series circuit of second capacitors, wherein the charging circuit is configured to individually charge each of the second capacitors.

15. The large-signal inductance measuring device according to claim 1, wherein the large-signal inductance measuring device is configured to close the disconnecting switch after completion of the measuring operation.

16. The large-signal inductance measuring device according to claim 1, wherein the large-signal inductance measuring device comprises a precharging circuit which is configured to charge the load before the disconnecting switch is closed, provided that the load is capacitive.

17. A method for performing a measuring operation for measuring an inductance at an electrical energy supply line arrangement operated with DC voltage and comprising a first conductor and a second conductor, by means of a large-signal inductance measuring device, the method comprising:

arranging the large-signal inductance measuring device between a first portion of the energy supply line arrangement, which is connected to an electrical energy source and comprises a source-side part of the inductance, and a second portion of the energy supply line arrangement, which is connected to an electrical load and comprises a load-side part of the inductance;

electrically disconnecting the first conductor of the energy supply line arrangement by means of a disconnecting switch;

measuring a first change in voltage at a first capacitive arrangement by means of a first measuring device, wherein the first change in voltage is generated by means of a first series circuit comprising the first capacitive arrangement and a first diode arrangement, wherein a first end of the first series circuit is electrically connected to the first conductor at a source-side side of the disconnecting switch, and which is configured such that, after disconnecting the first conductor, a first current caused by the source-side part of the inductance flows through the first series circuit, which current leads to the first change in voltage at the first capacitive arrangement;

measuring a second change in voltage at a second capacitive arrangement by means of a second measuring device, wherein the second change in voltage is generated by means of a second series circuit comprising the second capacitive arrangement and a second diode arrangement, wherein a first end of the second series circuit is electrically connected to the first conductor EL at a load-side side of the disconnecting switch, and which is configured such that, after disconnecting the first conductor, a second current caused by the load-side part of the inductance flows through the second series circuit, which current leads to the second change in voltage at the second capacitive arrangement;

measuring, by means of a third measuring device, a third current on the first conductor before the first conductor is disconnected; and evaluating the measured first change in voltage, the measured second change in voltage, and the measured third current by means of an evaluation device in order to determine the source-side part of the inductance from the measured first change in voltage and from the measured third current, and in order to determine the load-side part of the inductance from the measured second change in voltage and from the measured third current.

\* \* \* \* \*